No. 819,286. PATENTED MAY 1, 1906.
K. KIEFER.
METHOD OF CANDYING CHERRIES.
APPLICATION FILED DEC. 27, 1904.

Witnesses.
E. J. Appleton
G. W. Worden

Inventor.
Karl Kiefer

UNITED STATES PATENT OFFICE.

KARL KIEFER, OF CINCINNATI, OHIO.

METHOD OF CANDYING CHERRIES.

No. 819,286.     Specification of Letters Patent.     Patented May 1, 1906.

Application filed December 27, 1904. Serial No. 238,451.

*To all whom it may concern:*

Be it known that I, KARL KIEFER, a citizen of the United States, and a resident of Cincinnati, in the county of Hamilton and State of Ohio, have invented a new and useful Improvement in the Methods of Candying Cherries with the Stems, of which the following is a specification.

My invention relates to the process of candying cherries with sugar, the cherries having the stems attached, such fruit being commonly packed in boxes and used for eating and cooking purposes. The purpose of having the stem attached is to produce a nicer appearance of the fruit and, second, to enable the person eating the cherries to pick them from the box and eat without getting the fingers sticky.

Figure 1:
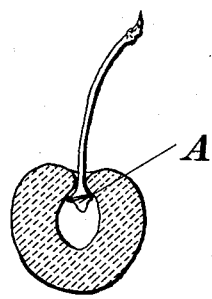
Figure 2:
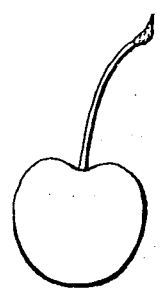
Figure 3:
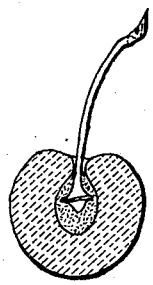
Figure 4:

In the accompanying drawings, Figure 1 shows a cross-section through the finished product of my improved process. Fig. 2 shows a view of the product. Fig. 3 shows a cross-section through the product of a modification of my improved process. Fig. 4 shows a stem prepared by a modification of this process.

For the purpose of my invention the cherries are pitted in such a manner that the seed is extracted through the stem-hole. The cherries are then subjected to a candying process, a description of which is not the object of this invention. This may be done by any of the present known methods. They may also be colored, the coloring, usually in imitation of the natural coloring, being a light red. I now take the stems and boil them separately in a solution of about 10° Baumé, letting them boil slowly, adding sugar during the course of eight to ten hours, until the solution reaches 38° Baumé. Then the stems will not shrink any more before drying, but look transparent, retaining their natural color. The stems are then inserted by hand or other means into the cherry, as shown in Fig. 1, so that the heavier part A, which formerly was attached to the cherry, is shoved farther into the cherry, as shown. Candied cherries have enough firmness to be elastic, and in the course of drying will attach themselves to the stem sufficiently to be lifted out of the box by the stem and eaten without becoming loosened unintentionally. If greater security of fastening is wanted, the stem may be dipped into molten cane-sugar, as shown in Fig. 4, which attaches itself in the shape of a pearl and hardens immediately. The stem so prepared is shoved into the seed-hole, as shown in Fig. 3.

What I claim as my invention, and desire to secure by Letters Patent, is—

1. The process of producing a seedless candied cherry with stem, consisting of seeding the cherry through the stem-hole, candying it, attaching the stem after being hardened itself by shoving the thicker part formerly attached to the cherry into the interior of the cherry, and allowing the flesh of the cherry to subsequently harden around it.

2. The process of producing seedless candied cherries with stem, consisting of seeding, candying and coloring the cherries and stems separately, attaching the stem to the cherry afterward by shoving the thicker part of the stem within the stem-hole of the cherry, and allowing the flesh of the cherry to close and harden around the stem.

3. A seedless candied cherry having the stem attached, characterized by having the appearance of the natural cherry in color and form, not showing any obliteration on the flesh of the cherry except near the stem-hole, having no seed, and having the thicker part of the stem shoved nearer the center than in a fresh cherry.

In testimony whereof I have signed my name in the presence of two subscribing witnesses.

KARL KIEFER.

Witnesses:
 E. J. APPLETON,
 G. W. WERDEN.